US011099777B2

(12) United States Patent
Haravu et al.

(10) Patent No.: US 11,099,777 B2
(45) Date of Patent: Aug. 24, 2021

(54) UNIFIED APPROACH TO IMPORT, REPLICATION, AND MIGRATION OF A STORAGE VOLUME

(71) Applicant: EMC IP Holding Company LLC, Hopkinton, MA (US)

(72) Inventors: Nagasimha Haravu, Apex, NC (US); Girish Sheelvant, Hopkinton, MA (US); Nagapraveen V. Seela, Cary, NC (US); Alan L. Taylor, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 333 days.

(21) Appl. No.: 16/049,148

(22) Filed: Jul. 30, 2018

(65) Prior Publication Data

US 2020/0034077 A1    Jan. 30, 2020

(51) Int. Cl.
*G06F 3/06* (2006.01)

(52) U.S. Cl.
CPC .......... *G06F 3/0659* (2013.01); *G06F 3/0604* (2013.01); *G06F 3/065* (2013.01); *G06F 3/067* (2013.01); *G06F 3/0647* (2013.01)

(58) Field of Classification Search
CPC .... G06F 3/0604; G06F 3/0635; G06F 3/0646; G06F 3/0647; G06F 3/065; G06F 3/067
See application file for complete search history.

(56) References Cited

U.S. PATENT DOCUMENTS

| 8,176,012 | B1* | 5/2012 | Rabii | G06F 16/184 |
| | | | | 707/655 |
| 8,751,598 | B1* | 6/2014 | Shankar | H04L 69/40 |
| | | | | 709/213 |
| 9,830,082 | B1 | 11/2017 | Srinivasan et al. | |
| 2014/0359058 | A1* | 12/2014 | Karnawat | G06F 3/0611 |
| | | | | 709/217 |

(Continued)

OTHER PUBLICATIONS

Robert P. Foley, et al., "Selective Raid Repair Based on Content Mapping," U.S. Appl. No. 15/281,951, filed Sep. 30, 2016.

(Continued)

*Primary Examiner* — Reginald G Bragdon
*Assistant Examiner* — Curtis James Kortman
(74) *Attorney, Agent, or Firm* — BainwoodHuang

(57) ABSTRACT

Techniques for providing a unified approach to an orchestration of services for accomplishing data import tasks, data replication tasks, and/or data migration tasks in a clustered storage environment. The techniques are employed in a clustered storage environment that includes one or more storage domains, each of which includes, as members of the storage domain, a primary storage appliance and one or more secondary storage appliances. By providing, in a primary storage appliance of a storage domain within a clustered storage environment, an orchestrator for orchestrating a set of orchestration phases, which can be shared to perform data import tasks, data replication tasks, and/or data migration tasks involving a foreign storage system deployed outside of the clustered storage environment and/or one or (Continued)

more data storage appliance deployed within the clustered storage environment, enhanced efficiencies due to infrastructure sharing within the clustered storage environment can be achieved.

20 Claims, 7 Drawing Sheets

(56) References Cited

U.S. PATENT DOCUMENTS

2019/0068690 A1\* 2/2019 Canton ............... H04L 41/0896

OTHER PUBLICATIONS

Peter Puhov, et al., "Merging Mapping Metadata to Promote Refrence Counting Efficiency," U.S. Appl. No. 15/499,488, filed Apr. 27, 2017.
Jean-Pierre Bono, et al., "Managing File System Tailored for Cluster Deployment," U.S. Appl. No. 15/664,993, filed Jul. 31, 2017.

\* cited by examiner

UNIFIED APPROACH TO IMPORT, REPLICATION, AND MIGRATION OF A STORAGE VOLUME

BACKGROUND

Data storage systems typically include one or more storage processors coupled to one or more arrays of non-volatile storage devices, such as magnetic disk drives, electronic flash drives, and/or optical drives. The storage processors are configured to service input/output (IO) requests generated by host computers that specify files, blocks, or other storage objects to be created on, read from, written to, and/or deleted from the respective storage device arrays. Such storage processors execute software that manage the incoming IO requests, as well as perform various data processing tasks to organize and maintain the files, blocks, or other storage objects on the non-volatile storage devices.

For data protection or data mobility purposes, the data storage systems perform data import tasks, data replication tasks, and/or data migration tasks involving one or more storage volumes. Data import tasks typically involve the transfer of volume data from a foreign storage system to a storage volume on a local storage system. Data replication tasks typically involve the copying of volume data from a production storage system to a replica volume on a remote storage system. Data migration tasks typically involve the transfer of both volume data and host connectivity from a source storage system to a secondary volume on a destination storage system.

SUMMARY

To perform data import tasks, data replication tasks, and/or data migration tasks, data storage systems typically employ separate orchestration engines to orchestrate services required to accomplish the respective tasks. For example, a data storage system deployed within a non-clustered storage environment may employ a first orchestration engine to perform data import tasks, a second orchestration engine to perform data replication tasks, and a third orchestration engine to perform data migration tasks. However, the use of separate orchestration engines to perform such data import tasks, data replication tasks, and/or data migration tasks can prove to be inefficient for data storage appliances deployed within a clustered storage environment. For example, a clustered storage environment may include multiple data storage appliances, some of which may be members of one or more storage domains. Further, in each storage domain, the member storage appliances may share at least some of the same hardware and/or software infrastructure (e.g., the same storage infrastructure, the same file system infrastructure, etc.) for workloads performed by their respective storage processors. At least some of the efficiencies gained by such infrastructure sharing in a clustered storage environment can be undermined, however, by taking a patchwork approach to the orchestration of services required to accomplish data import tasks, data replication tasks, and/or data migration tasks.

Techniques are disclosed herein for providing a unified approach to an orchestration of services for accomplishing data import tasks, data replication tasks, and/or data migration tasks in a clustered storage environment. The disclosed techniques can be employed in a clustered storage environment that includes one or more storage domains. Each storage domain can include a primary storage appliance and one or more secondary storage appliances, in which the primary and secondary storage appliances are interconnected by at least one network. In each storage domain, the primary storage appliance can include an orchestrator, a service layer, and an adapter layer. The orchestrator is configured to orchestrate a set of orchestration phases, which can be shared to perform data import tasks, data replication tasks, and/or data migration tasks involving, for example, (i) a foreign storage system deployed outside of the clustered storage environment and a data storage appliance deployed within the clustered storage environment, (ii) two data storage appliances deployed within the clustered storage environment, in which the respective storage appliances are members of two different storage domains, or (iii) two data storage appliances deployed within the clustered storage environment, in which the respective storage appliances are members of the same storage domain.

The service layer can include a plurality of layered orchestration services, each of which provides a level of abstraction in connection with execution of one or more of the orchestration phases. The adapter layer can include a plurality of adapters for use in communicating with one or more data storage appliances deployed within the clustered storage environment, and/or one or more data storage systems deployed outside of the clustered storage environment. Each adapter is configured to (i) receive one or more service directives from the various layered orchestration services, (ii) perform any translations needed on the respective service directives, for example, from a common orchestration service to an appropriate local or remote system call for a destination storage system (or appliance), and (iii) forward the local or remote system call to the destination storage system (or appliance). Each adapter is further configured to (i) receive one or more responses from the destination storage system (or appliance), (ii) perform any translations needed on the respective responses, and (iii) forward the respective responses to the layered orchestration service(s) from which the service directives were originally received.

By providing, in a primary storage appliance of a storage domain within a clustered storage environment, an orchestrator for orchestrating a set of orchestration phases, which can be shared to perform data import tasks, data replication tasks, and/or data migration tasks involving a foreign storage system deployed outside of the clustered storage environment and/or one or more data storage appliances deployed within the clustered storage environment, enhanced efficiencies due to infrastructure sharing within the clustered storage environment can be achieved.

In certain embodiments, a method of providing a unified approach to an orchestration of services for accomplishing data import tasks, data replication tasks, and data migration tasks in a clustered storage environment includes providing a primary storage appliance and a secondary storage appliance as members of a first storage domain in the clustered storage environment. The method further includes initiating performance of two or more of (i) the data import tasks, (ii) the data replication tasks, and (iii) the data migration tasks by the primary storage appliance, and, having initiated the performance of two or more of (i) the data import tasks, (ii) the data replication tasks, and (iii) the data migration tasks, dynamically orchestrating, by the primary storage appliance, a sharing of two or more orchestration phases among the two or more of (i) the data import tasks, (ii) the data replication tasks, and (iii) the data migration tasks. Each of the two or more orchestration phases initiates one or more services for accomplishing the two or more of (i) the data import tasks, (ii) the data replication tasks, and (iii) the data migration tasks.

In certain arrangements, the method further includes initiating two or more of (i) the data import tasks, (ii) the data replication tasks, and (iii) the data migration tasks between a source storage object and a target storage object, in which each of the source storage object and the target storage object corresponds to one of a storage volume, a virtual volume, a file system, and a consistency (or application) group.

In certain arrangements, the method further includes initiating two or more of (i) the data import tasks, (ii) the data replication tasks, and (iii) the data migration tasks between a source storage object and a target storage object, in which the source storage object and the target storage object correspond to a source volume and a target volume, respectively.

In certain arrangements, the method further includes dynamically orchestrating the sharing of two or more of (i) a first phase to provision the target volume, (ii) a second phase to perform an asynchronous copy of data from the source volume to the target volume, (iii) a third phase to present, to a host computer, a path between the target volume and the host computer, (iv) a fourth phase to mirror the data from the source volume to the target volume, (v) a fifth phase to terminate the mirroring of the data from the source volume to the target volume, (vi) a sixth phase to perform a synchronous copy of the data from the source volume to the target volume, (viii) a seventh phase to disable a path between the source volume and the host computer, and to enable the path between the target volume and the host computer, (viii) an eighth phase to reverse roles of the source volume and the target volume, and (ix) a ninth phase to delete the target volume.

In certain arrangements, the second phase for performing an asynchronous copy of data from the source volume to the target volume includes taking a common base snapshot of the source volume, and moving data of the common base snapshot to the target volume by copying at least some of the data of the common base snapshot asynchronously.

In certain arrangements, the method further includes initiating one or more layered service components including (i) a first component to mirror data from a local volume to a remote volume, (ii) a second component to copy data from one storage volume to another storage volume, (iii) a third component to coordinate activities between the first component and the second component, so as to resolve any potential conflicts between the first and second components, and (iv) a fourth component to provide a proxy service to the remote volume, allowing one or more of the first component, the second component, and the third component to treat the remote volume as the local volume.

In certain arrangements, the method further includes, for each of the two or more orchestration phases, engaging one or more of the first component, the second component, the third component, and the fourth component for accomplishing the two or more of (i) the data import tasks, (ii) the data replication tasks, and (iii) the data migration tasks.

In certain arrangements, the method further includes (i) receiving, at an adapter layer of the primary storage appliance, one or more service directives from one or more of the first component, the second component, the third component, and the fourth component, (ii) performing one or more translations on the respective service directives from a common orchestration service to one of a local system call and a remote system call to a destination storage system (or appliance), and (iii) forwarding, by the primary storage appliance, the one of the local system call and the remote system call to the destination storage system (or appliance).

In certain arrangements, the method further includes (i) receiving, at the adapter layer of the primary storage appliance, one or more responses from the destination storage system (or appliance), (ii) performing one or more translations on the respective responses, and (iii) forwarding the respective responses to one or more of the first component, the second component, the third component, and the fourth component from which the one or more service directives were originally received.

In certain arrangements, the method further includes (i) involving, in the data import tasks, one of the primary storage appliance and the secondary storage appliance deployed within the clustered storage environment, and a foreign storage system deployed outside of the clustered storage environment, (ii) involving, in the data replication tasks, one of the primary storage appliance and the secondary storage appliance in the first storage domain, and another storage appliance that is a member of a second storage domain in the clustered storage environment, the second storage domain being different from the first storage domain, (iii) and involving, in the data migration tasks, the primary storage appliance and the secondary storage appliance in the first storage domain.

In certain embodiments, a system for providing a unified approach to an orchestration of services for accomplishing data import tasks, data replication tasks, and data migration tasks in a clustered storage environment includes (i) a primary storage appliance, (ii) one or more secondary storage appliances, in which the primary storage appliance and the one or more secondary storage appliances are members of a storage domain in the clustered storage environment, and (iii) at least one network interconnecting the primary storage appliance and the one or more secondary storage appliances. The primary storage appliance is configured to execute program instructions to (i) initiate performance of two or more of (i) the data import tasks, (ii) the data replication tasks, and (iii) the data migration tasks, and (ii) having initiated the performance of two or more of (i) the data import tasks, (ii) the data replication tasks, and (iii) the data migration tasks, dynamically orchestrate a sharing of two or more orchestration phases among the two or more of (i) the data import tasks, (ii) the data replication tasks, and (iii) the data migration tasks. Each of the two or more orchestration phases are configured to initiate one or more services for accomplishing the two or more of (i) the data import tasks, (ii) the data replication tasks, and (iii) the data migration tasks.

Other features, functions, and aspects of the invention will be evident from the Detailed Description that follows.

BRIEF DESCRIPTION OF THE DRAWINGS

The foregoing and other objects, features, and advantages will be apparent from the following description of particular embodiments of the invention, as illustrated in the accompanying drawings in which like reference characters refer to the same parts throughout the different views.

DETAILED DESCRIPTION

Techniques are disclosed herein for providing a unified approach to an orchestration of services for accomplishing data import tasks, data replication tasks, and/or data migration tasks in a clustered storage environment. The disclosed techniques can be employed in a clustered storage environment that includes one or more storage domains, each of which can include, as members of the storage domain, a primary storage appliance and one or more secondary storage appliances. By providing, in a primary storage appliance of a storage domain within a clustered storage environment, an orchestrator for orchestrating a set of orchestration phases, which can be shared to perform data import tasks, data replication tasks, and/or data migration tasks involving a foreign storage system deployed outside of the clustered storage environment and/or one or more data storage appliances deployed within the clustered storage environment, enhanced efficiencies due to infrastructure sharing within the clustered storage environment can be achieved.

Figure 1:
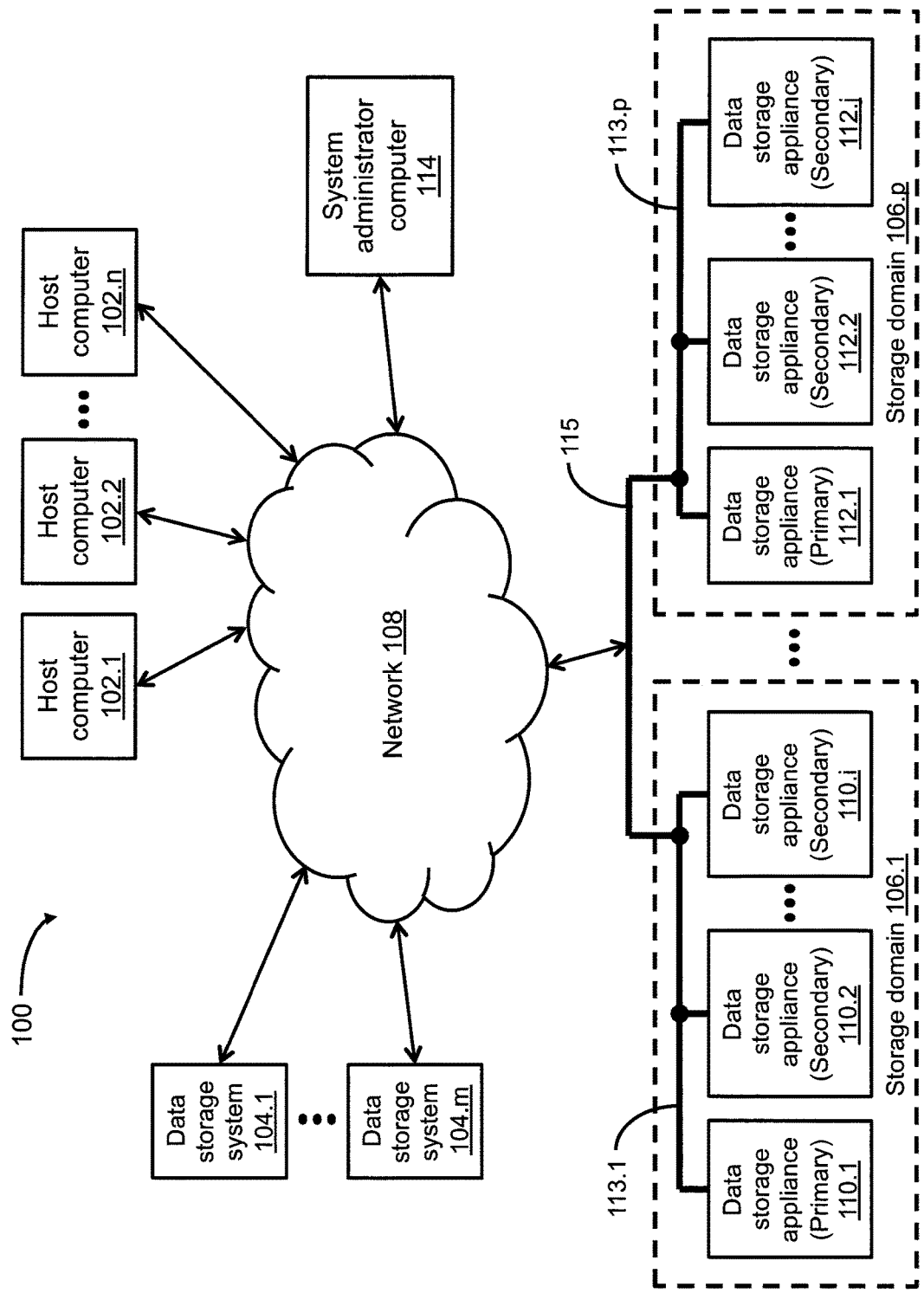
FIG. 1 is a block diagram of an exemplary clustered storage environment, and a plurality of foreign storage systems deployed outside of the clustered storage environment, in which techniques may be practiced for providing a unified approach to an orchestration of services for accomplishing data import tasks, data replication tasks, and/or data migration tasks.

FIG. 1 depicts an illustrative embodiment of a clustered storage environment 100, in which techniques can be practiced for providing a unified approach to an orchestration of services for accomplishing data import tasks, data replication tasks, and/or data migration tasks. As shown in FIG. 1, the clustered storage environment 100 can include a plurality of host computers 102.1, 102.2, . . . , 102.n, a plurality of storage domains 106.1, . . . , 106.p, and a system administrator computer 114, which are interconnected by at least one network 108. For example, each of the plurality of host computers 102.1, . . . , 102.n may be configured as a web server computer, a file server computer, an email server computer, an enterprise server computer, or any other suitable computer or computerized device. Further, the system administrator computer 114 may be remote from (such as in a data center) or local to the respective storage domains 106.1, . . . , 106.p within the clustered storage environment 100.

As further shown in FIG. 1, the storage domain 106.1 can include, as members of the storage domain 106.1, a plurality of data storage appliances 110.1, 110.2, . . . , 110.i, and the storage domain 106.p can include, as members of the storage domain 106.p, a plurality of data storage appliances 112.1, 112.2, . . . , 112.j. In the storage domain 106.1, the data storage appliance 110.1 can be elected or otherwise designated to perform (at least temporarily) a role of a primary storage appliance, while each of the remaining data storage appliances 110.2, . . . , 110.i perform (at least temporarily) a role of a secondary storage appliance. In the storage domain 106.p, the data storage appliance 112.1 can likewise be elected or otherwise designated to perform (at least temporarily) a role of a primary storage appliance, while each of the remaining data storage appliances 112.2, . . . , 112.j perform (at least temporarily) a role of a secondary storage appliance. The storage domain 106.1 can further include a local area network (LAN) 113.1 such as an Ethernet network or any other suitable network, which is configured to interconnect the plurality of data storage appliances 110.1, . . . , 110.i. Similarly, the storage domain 106.p can further include a LAN 113.p such as an Ethernet network or any other suitable network, which is configured to interconnect the plurality of data storage appliances 112.1, . . . , 112.j. A plurality of such LANs 113.1, . . . , 113.p included in the plurality of storage domains 106.1, . . . , 106.p, respectively, can be interconnected by a metropolitan network (MAN) 115 or any other suitable network.

Within the clustered storage environment 100 of FIG. 1, the system administrator computer 114 can be configured to execute program instructions to enable a system administrator or other user to define and/or configure the respective storage domains 106.1, . . . , 106.p. Further, the plurality of host computers 102.1, . . . , 102.n can be configured to provide, over the network 108, input/output (IO) requests (e.g., read requests, write requests) to the respective storage appliances 110.1, . . . , 110.i of the storage domain 106.1, as well as to the respective storage appliances 112.1, . . . , 112.j of the storage domain 106.p. For example, such IO requests may direct the respective storage appliances 110.1, . . . , 110.i, . . . , 112.1, . . . , 112.j to read and/or write files, blocks, or other storage objects from/to storage volumes (e.g., logical units (LUNs)), virtual volumes (VVOLs), file systems, or consistency (or application) groups stored in association with the respective storage appliances 110.1, . . . , 110.i, . . . , 112.1, . . . , 112.j. As employed herein, the term "consistency group" or "application group" refers to a set of storage volumes (e.g., LUNs) of a host application stored in association with at least one storage appliance.

As shown in FIG. 1, the network 108 is connected to the plurality of storage domains 106.1, . . . , 106.p within the clustered storage environment 100, as well as to a plurality of data storage systems 104.1, . . . , 104.m (also referred to herein as "foreign storage systems") deployed outside of the clustered storage environment 100. For example, the network 108 may include copper-based data communications devices and cabling, fiber optic-based devices and cabling, wireless devices, and/or any other suitable devices and/or cabling. Further, the network 108 may be configured to support storage area network (SAN)-based communications, LAN-based communications, MAN-based communications, wide area network (WAN)-based communications, distributed infrastructure communications, cellular communications, and/or any other suitable communications.

Figure 2:
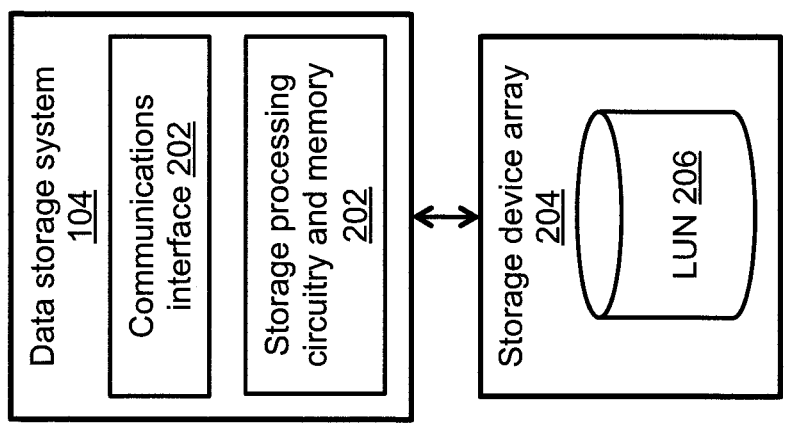
FIG. 2 is a block diagram of an exemplary foreign storage system among the plurality of foreign storage systems of FIG. 1.

FIG. 2 depicts an illustrative embodiment of an exemplary data storage system 104 among the plurality of data storage systems 104.1, . . . , 104.m of FIG. 1. It is noted that each of the data storage systems 104.1, . . . , 104.m of FIG. 1 can be configured like the data storage system 104 of FIG. 2. As shown in FIG. 2, the data storage system 104 can include a communications interface 202, and storage processing circuitry and memory 202. The communications interface 202 can be configured to connect the data storage system 104 to the network 108, enabling access to/from the respective host computers 102.1, ..., 102.n, the respective storage appliances 110.1, ..., 110.i of the storage domain 106.1, and the respective storage appliances 112.1, ..., 112.j of the storage domain 106.p. Such access over the network 108 can be SAN-based, Internet protocol (IP)-based, cellular-based, cable-based, fiber optic-based, cloud-based, wireless, and so on, or any suitable combination thereof. The storage processing circuitry and memory 202 can include one or more storage processors, data movers, director boards, blades, IO modules, storage drive controllers, switches, and/or any other suitable computer hardware or combination thereof. The storage processing circuitry and memory 202 can further include persistent memory storage (e.g., flash memory, magnetic memory) and non-persistent memory storage (e.g., dynamic random access memory (DRAM), static random access memory (SRAM)), and accommodate a variety of software constructs including operating system code and data, data storage system code and data, etc.

It is noted that the plurality of host computers 102.1, ..., 102.n of FIG. 1 can be configured to provide, over the network 108, IO requests (e.g., read requests, write requests) to the data storage system 104 of FIG. 2, directing the data storage system 104 to read and/or write files, blocks, or other storage objects from/to one or more storage volumes (e.g., LUNs), VVOLs, consistency (or application) groups, or file systems stored in association with the data storage system 104. For example, such data storage associated with the data storage system 104 may be provided, at least in part, by a storage device array 204, which, for purposes of illustration, may include a storage drive arranged as a storage volume or LUN 206. Further, such a storage drive included in the storage device array 204 may be configured as a magnetic disk drive, an electronic flash drive, or any other suitable storage drive.

Figure 3A:
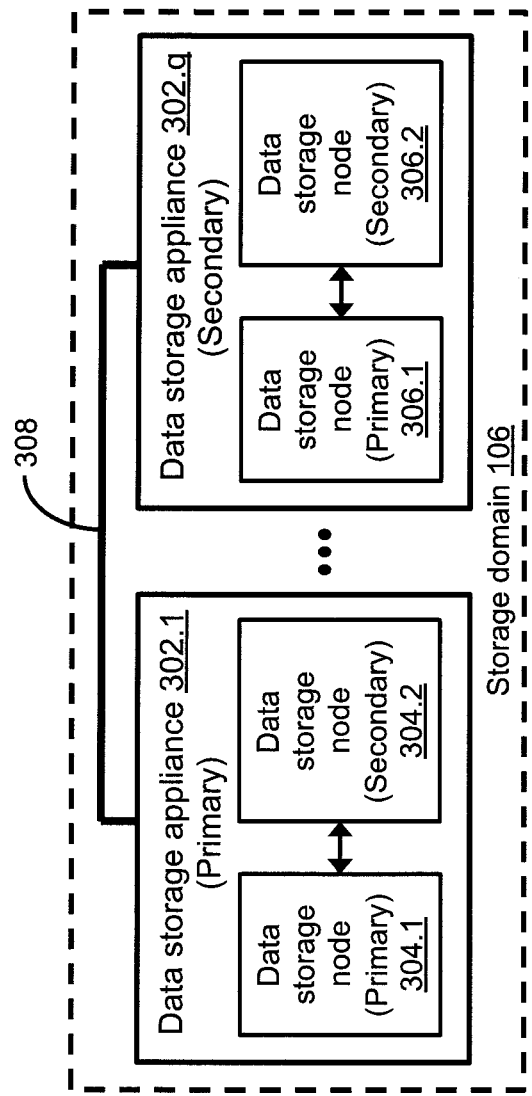
FIG. 3a is a block diagram of an exemplary storage domain included in the clustered storage environment of FIG. 1, in which the storage domain includes, as members of the storage domain, a primary storage appliance and one or more secondary storage appliances, each of the primary and secondary storage appliances including a primary storage node and a secondary storage node.

FIG. 3a depicts an illustrative embodiment of an exemplary storage domain 106 among the plurality of storage domains 106.1, ..., 106.p of FIG. 1. It is noted that each of the storage domains 106.1, ..., 106.p of FIG. 1 can be configured like the storage domain 106 of FIG. 3a. As shown in FIG. 3a, the storage domain 106 can include, as members of the storage domain 106, a single data storage appliance 302.1 designated to perform a role of a primary storage appliance, and at least one additional data storage appliance 302.q designated to perform a role of a secondary storage appliance. The storage domain 106 can further include a LAN 308 such as an Ethernet network or any other suitable network, which is configured to interconnect the primary storage appliance 302.1 and the secondary storage appliance(s) 302.q. The primary storage appliance 302.1 can include two data storage nodes 304.1, 304.2 for providing high availability within the clustered storage environment 100. Likewise, the secondary storage appliance 302.q can include two data storage nodes 306.1, 306.2 for providing high availability within the clustered storage environment 100. In the primary storage appliance 302.1, the data storage node 304.1 can be elected or otherwise designated to perform (at least temporarily) a role of a primary storage node, while the data storage node 304.2 performs (at least temporarily) a role of a secondary storage node. For example, in the primary storage appliance 302.1, the primary storage node 304.1 may (i) receive IO requests from one or more of the host computers 102.1, ..., 102.n over the network 108, (ii) in response to the IO requests, read and/or write files, blocks, or other storage objects from/to one or more LUNs, VVOLs, consistency (or application) groups, or file systems stored in association with the primary storage node 304.1, and, (iii) at least at intervals, synchronize data stored in association with the primary storage node 304.1 with corresponding data stored in association with the secondary storage node 304.2. In the event of a failure of the primary storage node 304.1, the secondary storage node 304.2 can assume the role of the primary storage node 304.1, providing high availability within the clustered storage environment 100.

Similarly, in the secondary storage appliance 302.q, the data storage node 306.1 can be elected or otherwise designated to perform (at least temporarily) a role of a primary storage node, while the data storage node 306.2 performs (at least temporarily) a role of a secondary storage node. Further, in the secondary storage appliance 302.q, the primary storage node 306.1 may (i) receive IO requests from one or more of the host computers 102.1, ..., 102.n over the network 108, (ii) in response to the IO requests, read and/or write files, blocks, or other storage objects from/to one or more LUNs, VVOLs, consistency (or application) groups, or file systems stored in association with the primary storage node 306.1, and, (iii) at least at intervals, synchronize data stored in association with the primary storage node 306.1 with corresponding data stored in association with the secondary storage node 306.2. In the event of a failure of the primary storage node 306.1, the secondary storage node 306.2 can assume the role of the primary storage node 306.1, further providing high availability within the clustered storage environment 100.

Figure 3B:
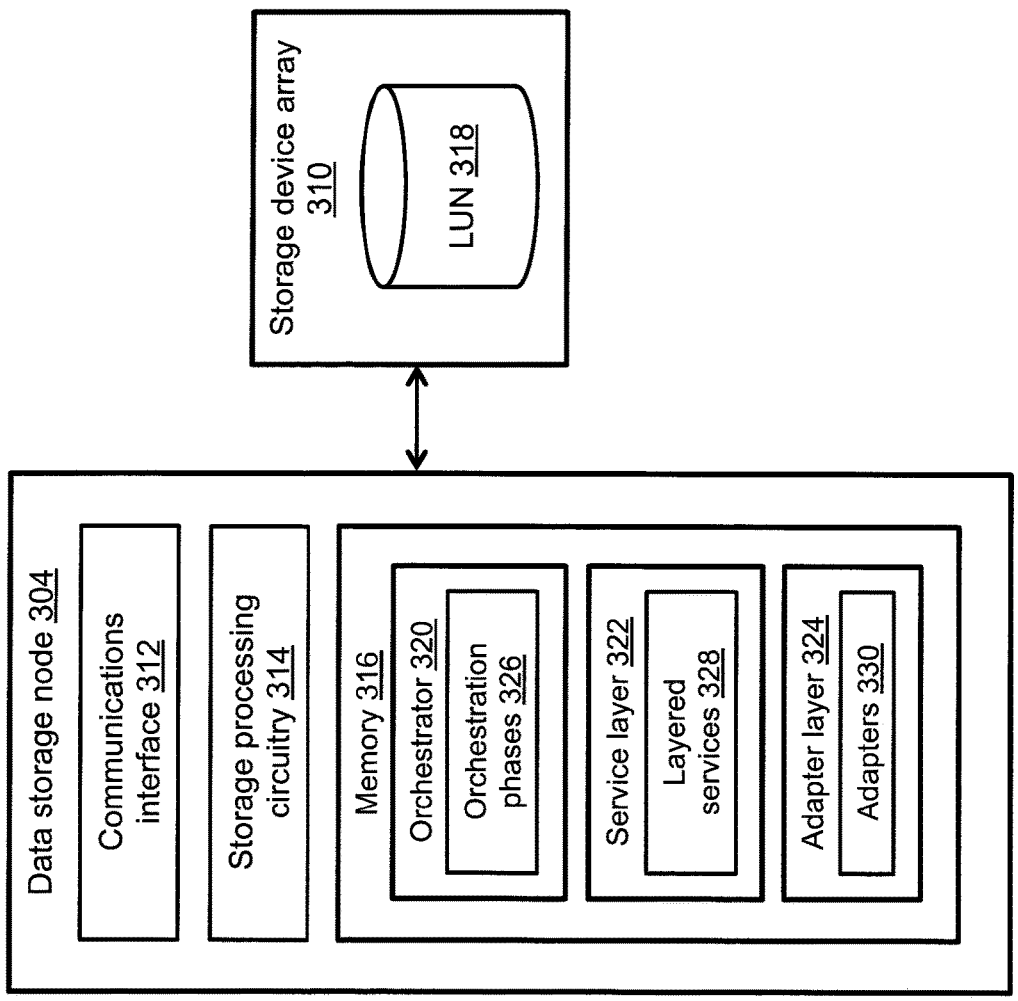
FIG. 3b is a block diagram of an exemplary storage node among the primary and secondary storage nodes of FIG. 3a, in which the respective storage node includes an orchestrator, a service layer, and an adapter layer.

FIG. 3b depicts an illustrative embodiment of an exemplary data storage node 304 among the primary and secondary storage nodes 304.1, 304.2 of FIG. 3a. It is noted that each of the primary and secondary storage nodes 304.1, 304.2 of FIG. 3a can be configured like the data storage node 304 of FIG. 3b. As shown in FIG. 3b, the data storage node 304 can include a communications interface 312, storage processing circuitry 314, and a memory 316. The communications interface 312 can be configured to connect the data storage node 304 to the network 108, enabling access to/from the respective host computers 102.1, ..., 102.n, as well as to/from the respective storage systems 104.1, ..., 104.m. Such access over the network 108 can be SAN-based, IP-based, cellular-based, cable-based, fiber optic-based, cloud-based, wireless, and so on, or any suitable combination thereof. The storage processing circuitry 314 can include one or more storage processors, data movers, director boards, blades, IO modules, storage drive controllers, switches, and/or any other suitable computer hardware or combination thereof. The memory 316 can include persistent memory storage (e.g., flash memory, magnetic memory) and non-persistent memory storage (e.g., DRAM, SRAM), and accommodate a variety of software constructs including, but not limited to, an orchestrator 320, a service layer 322, and an adapter layer 324, as well as operating system code/data and data storage system code/data.

The data storage node 304 can be associated with underlying data storage provided, at least in part, by a storage device array 310, which, for purposes of illustration, may include a storage drive arranged as a storage volume or LUN 318. For example, the storage drive may be configured as a hard disk drive (HDD), a solid state drive (SSD), a tape drive, an optical drive, a network attached storage (NAS) device, a SAN device, or any other suitable storage drive or device. Further, the storage drive may be locally attached to an IO channel of the data storage node 304, while also being accessible over the network 108. It is noted that the LUN 318 can be a single stand-alone component, or a system of storage drives or devices such as a collection of drives (e.g., a RAID group). In one embodiment, the storage device array 310 is implemented as a dual-ported drive, which can be shared between the primary storage node 304.1 and the secondary storage node 304.2 of the primary storage appliance 302.1.

It is noted that each of the primary and secondary storage nodes 306.1, 306.2 of FIG. 3a can be configured like the data storage node 304 of FIG. 3b, but omitting the orchestrator 320, the service layer 322, and the adapter layer 324. It is further noted that the various software constructs stored in the memory 316 of the data storage node 304 (see FIG. 3b) can include one or more sets of instructions that direct the storage processing circuitry 314 to implement the techniques disclosed herein. For example, the storage processing circuitry 314 may be implemented in various ways, using one or more processors (or cores) running specialized software, one or more application specific integrated circuits (ASICs), one or more field programmable gate arrays (FPGAs), one or more discrete components, digital circuits, analog circuits, and so on, or any suitable combination thereof.

In the context of the storage processing circuitry 314 being implemented using one or more processors running specialized software, a computer program product can be configured to deliver all or a portion of the software constructs to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of instructions that, when executed by the respective processor(s), perform the techniques disclosed herein. For example, such media may be considered to be articles of manufacture, and may be transportable from one data storage appliance to another data storage appliance.

The techniques disclosed herein provide a unified approach to an orchestration of services for accomplishing data import tasks, data replication tasks, and/or data migration tasks in a clustered storage environment. To that end, the orchestrator 320 of the data storage node 304 (see FIG. 3b), in association with its service layer 322 and adapter layer 324, is configured to orchestrate a set of orchestration phases 326, which can be shared to perform data import tasks, data replication tasks, and/or data migration tasks involving, for example, (i) a foreign storage system deployed outside of the clustered storage environment and a data storage appliance deployed within the clustered storage environment, (ii) two data storage appliances deployed within the clustered storage environment, in which the respective storage appliances are members of two different storage domains, or (iii) two data storage appliances deployed within the clustered storage environment, in which the respective storage appliances are members of the same storage domain.

As shown in FIG. 3b, the service layer 322 can include a plurality of layered orchestration services 328, each of which provides a level of abstraction in connection with execution one or more of the orchestration phases 326. As further shown in FIG. 3b, the adapter layer 324 can include a plurality of adapters 330 for use in communicating with one or more data storage appliances deployed within the clustered storage environment, and/or one or more foreign storage systems deployed outside of the clustered storage environment. Each of the adapters 330 is configured to (i) receive one or more service directives from the various layered orchestration services 328, (ii) perform any translations needed on the respective service directives, for example, from a common orchestration service to an appropriate local or remote system call for a destination storage system (or appliance), and (iii) forward the local or remote system call to the destination storage system (or appliance). Each of the adapters 330 is further configured to (i) receive one or more responses from the destination storage system (or appliance), (ii) perform any translations needed on the respective responses, and (iii) forward the respective responses to the layered orchestration service(s) 328 from which the service directives were originally received.

By providing, in a primary storage appliance of a storage domain within a clustered storage environment, an orchestrator for orchestrating a set of orchestration phases, which can be shared to perform data import tasks, data replication tasks, and/or data migration tasks involving a foreign storage system deployed outside of the clustered storage environment and/or one or more data storage appliances deployed within the clustered storage environment, enhanced efficiencies due to infrastructure sharing within the clustered storage environment can be achieved.

Figure 4A:
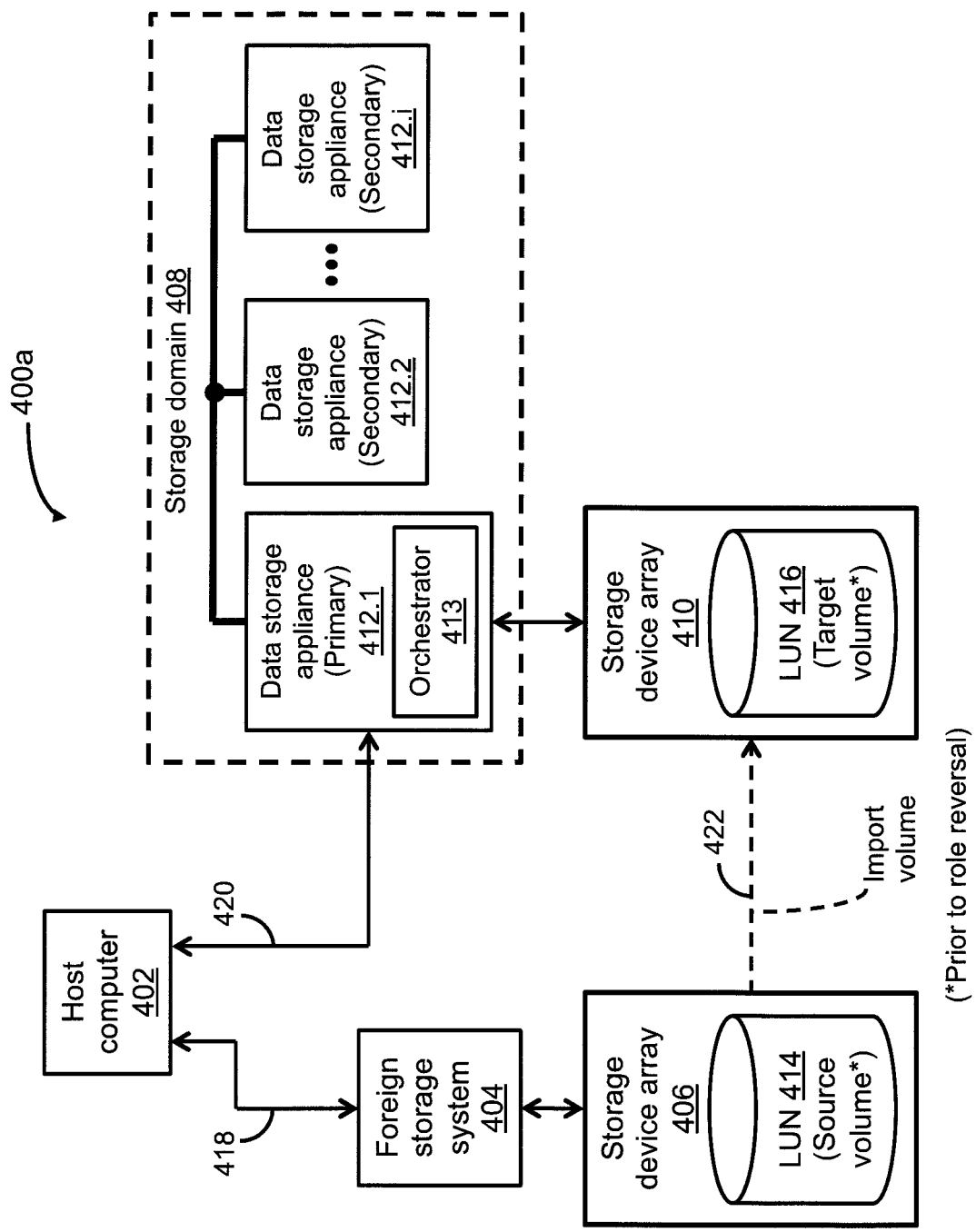
FIG. 4a is a block diagram of an exemplary first use case for performing data import tasks within the clustered storage environment of FIG. 1.
Figure 4B:
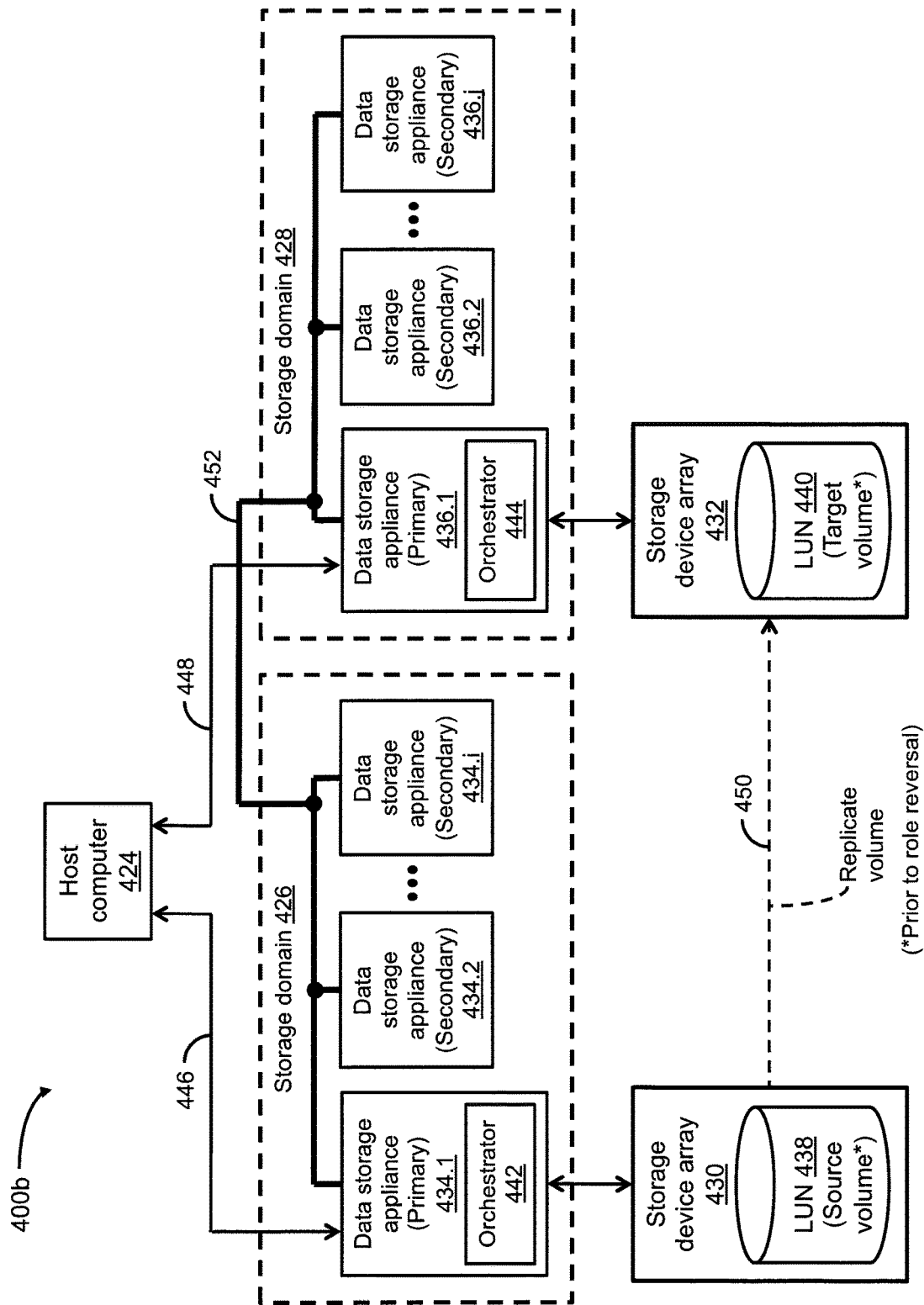
FIG. 4b is a block diagram of an exemplary second use case for performing data replication tasks within the clustered storage environment of FIG. 1.
Figure 4C:
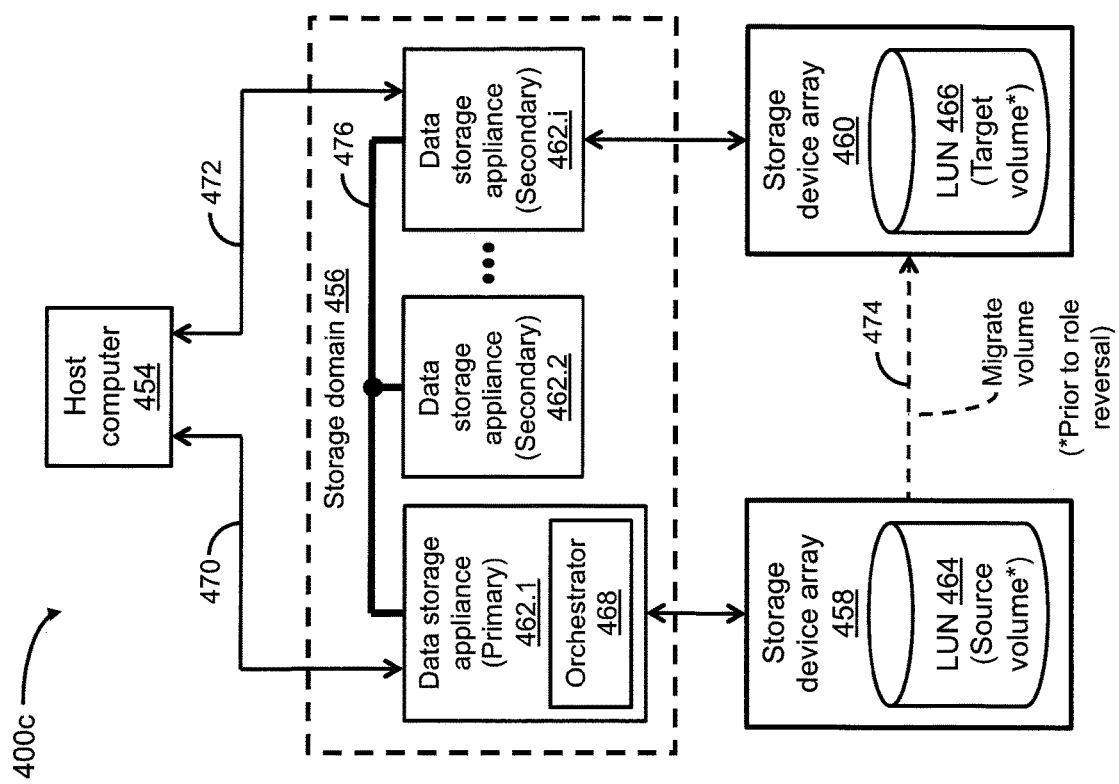
FIG. 4c is a block diagram of an exemplary third use case for performing data migration tasks within the clustered storage environment of FIG. 1.

The disclosed techniques for providing a unified approach to an orchestration of services for accomplishing data import tasks, data replication tasks, and/or data migration tasks in a clustered storage environment will be further understood with reference to the following illustrative use cases, as well as FIGS. 4a-4c. In the following use cases, the shared orchestration phases for performing such data import tasks, data replication tasks, and/or data migration tasks can include (i) a "provision target volume" phase, (ii) an "asynchronous copy" phase, (iii) a "multi-pathing" phase, (iv) a "start mirroring" phase, (v) an "end mirroring" phase, (vi) a "synchronous copy" phase, (vii) a "path cutover" phase, (viii) a "role reversal" phase, and (ix) a "delete target volume" phase.

The provision target volume phase involves the provisioning of a target storage volume. For example, while performing data import tasks, the provision target volume phase may be executed to provision a storage volume on (or associated with) a data storage appliance deployed within the clustered storage environment. Further, while performing data replication tasks, the provision target volume phase may be executed to provision a replica volume on (or associated with) a data storage appliance deployed within the clustered storage environment. In addition, while performing data migration tasks, the provision target volume phase may be executed to provision a secondary volume on (or associated with) a data storage appliance deployed within the clustered storage environment.

The asynchronous copy phase involves the taking of a temporary snapshot (also referred to herein as a "common base snapshot") of a source volume, and moving data of the common base snapshot to a target volume by copying the data asynchronously. As employed herein, the term "snapshot" refers to a point-in-time (PIT) replication of a storage volume (e.g., a LUN, VVOL) along with its associated metadata. Once execution of the asynchronous copy phase is completed, the same common base snapshot exists on both the source volume and the target volume. When the asynchronous copy phase is executed a subsequent time, a differential copy of the snapshot data is performed, moving only changes or differences between a common base snapshot and the previous common base snapshot to the target volume. It is noted that, while executing the asynchronous copy phase, a data storage system or appliance may be called upon to (i) create a snapshot, (ii) read data from a snapshot, and/or (iii) compute, derive, or otherwise obtain changes or differences between two snapshots.

The multi-pathing phase involves the presenting of a path between a target volume and a host computer, using the same identity as a corresponding source volume. By executing multi-pathing code resident in its memory, such a host computer can be made to view the path to the target volume as another path to the source volume.

The start mirroring phase involves the mirroring (i.e., writing or copying) of data from a source volume to a target volume. While executing the start mirroring phase, write requests issued by a host computer, for writing data to the source volume or the target volume, can be satisfied by writing the data simultaneously to both the source volume and the target volume. The writing of the data is not acknowledged to the host computer until the data has been written to both the source volume and the target volume. Read requests issued by the host computer are satisfied by reading the data from the source volume.

The end mirroring phase involves the terminating of data mirroring from a source volume to a target volume. While executing the end mirroring phase, a snapshot is taken of each of the source volume and the target volume to serve as common base snapshots for a subsequent asynchronous copying operation.

The synchronous copy phase normally involves, once data mirroring is enabled, a copying of all data from a source volume to a target volume. However, if the synchronous copy phase is preceded by the asynchronous copy phase, then only changes or differences between the source volume data and the target volume data are copied to the target volume.

The path cutover phase involves the disabling of a path from a host computer to a source volume on (or associated with) a data storage system or appliance, as well as the enabling of a path from the host computer to a target volume on (or associated with) the same (or a different) data storage system or appliance. It is noted that such disabling and enabling operations can be performed atomically and in a non-disruptive fashion.

The role reversal phase involves the reversing of the roles of a source volume and a target volume. The delete target volume phase involves the deleting of a target volume.

With regard to the following illustrative use cases, the layered orchestration services 328 can include (i) a "mirroring" component, (ii) a "copier" component, (iii) an "input/output (IO) coordinator" component, and (iv) a "transit volume" component. The mirroring component involves the mirroring of data from a local volume to a remote volume. The copier component involves the copying of data from one storage volume to another storage volume, e.g., either from a local volume to a remote volume, or from a remote volume to a local volume. The IO coordinator component involves the coordinating of activities between the mirroring component and the copier component, so as to resolve any potential conflicts between the respective components. The transit volume component involves the providing of a proxy service to a remote volume, allowing the mirroring component, the copier component, and/or the IO coordinator component to treat the remote volume as a local volume. With reference to the data storage node 304 of FIG. 3b, the orchestrator 320 can engage, for each of the orchestration phases 326, one or more of the respective components in the layered orchestration services 328, which can operate, in association with one or more of the adapters 330 in the adapter layer 324, to accomplish the respective data import tasks, data replication tasks, and/or data migration tasks.

FIG. 4a depicts a first illustrative use case for performing data import tasks within a clustered storage environment 400a. As shown in FIG. 4a, the first use case involves a host computer 402, a foreign storage system 404, and a storage domain 408. The foreign storage system 404 is associated with a storage device array 406 that includes a storage drive arranged as a LUN 414 (the "source volume"). The storage domain 408 includes, as members of the storage domain 408, a plurality of data storage appliances 412.1, 412.2, . . . , 412.i. The data storage appliance 412.1 can be elected or otherwise designated to perform a role of a primary storage appliance, while each of the remaining data storage appliances 412.2, . . . , 412.i perform a role of a secondary storage appliance. The primary storage appliance 412.1 includes an orchestrator 413, which orchestrates shared orchestration phases for performing the data import tasks. Further, the primary storage appliance 412.1 is associated with a storage device array 410 that includes a storage drive arranged as a LUN 416 (the "target volume").

It is noted that the host computer 402, the foreign storage system 404, and the storage domain 408 can be interconnected by at least one network (not shown), such as the network 108 (see FIG. 1). It is further noted that the host computer 402, the storage domain 408, and the network (including paths 418, 420) are deployed within the clustered storage environment 400a, while the foreign storage system 404 is deployed outside of the clustered storage environment 400a. An "import volume" path 422, extending from the storage device array 406 to the storage device array 410, is depicted in FIG. 4a in phantom for purposes of illustration only.

The first illustrative use case of FIG. 4a is applicable to the case where the foreign storage system 404 has capabilities of creating a snapshot, reading data from a snapshot, and/or computing, deriving, or otherwise obtaining changes or differences between two snapshots, as well as to the case where the foreign storage system 404 lacks those snapshot capabilities. If the foreign storage system 404 can create a snapshot, read data from a snapshot, and/or obtain changes or differences between two snapshots, then the first use case for performing data import tasks can involve the following orchestration of phases by the orchestrator 413 included in the primary storage appliance 412.1:

1) Provision target volume phase—Provision the LUN 416 associated with the primary storage appliance 412.1 as a target volume. It is noted that a LUN associated with any one of the secondary storage appliances 412.2, . . . , 412.i may alternatively be provisioned as the target volume.

2) Asynchronous copy phase—Copy a majority of data from a source volume (i.e., the LUN 414) to the target volume (i.e., the LUN 416).

3) Multi-pathing phase—Present, to the host computer 402, the path 420 between the host computer 402 and the primary storage appliance 412.1. At this stage of the orchestration of phases, the path 420 is disabled, while the path 418 between the host computer 402 and the foreign storage system 404 is enabled.

4) Start mirroring phase—Mirror the data from the source volume 414 to the target volume 416. Write requests issued by the host computer 402, for writing data to the source volume 414 or the target volume 416, are satisfied by writing the data simultaneously to both the source volume 414 and the target volume 416. The writing of the data is not acknowledged to the host computer 402 until such data has been written to both the source volume 414 and the target volume 416. Read requests issued by the host computer 402 are satisfied by reading the data from the source volume 414.

5) Path cutover phase—Disable the path 418 between the host computer 402 and the foreign storage system 404, and enable the path 420 between the host computer 402 and the primary storage appliance 412.1.

6) Synchronous copy phase—Copy, to the target volume 416, any changes or differences between the data of the source volume 414 and the data of the target volume 416.

7) Role reversal and end mirroring phases—Reverse roles of the source volume 414 and the target volume 416. After the role reversal, the LUN 416 is the source volume, and the LUN 414 is (temporarily) the target volume. Write requests for writing data to the source volume 416 are not mirrored to the target volume 414 (i.e., data mirroring from the source volume 416 to the target volume 414 is terminated). Read requests are serviced from the source volume 416. The foreign storage system 404 takes a snapshot of the target volume 414, and the primary storage appliance 412.1 likewise takes a snapshot of the source volume 416, thereby obtaining common base snapshots for subsequent asynchronous copying operations.

8) Delete target volume phase—Delete the target volume 414 on the storage device array 406 associated with the foreign storage system 404. Once the target volume 414 is deleted, the data import tasks are completed for importing the storage volume 414 associated with the foreign storage system 404 to the storage volume 416 associated with the primary storage appliance 412.1.

If the foreign storage system 404 lacks the foregoing snapshot capabilities, then the first use case for performing data import tasks can involve the following orchestration of phases by the orchestrator 413 included in the primary storage appliance 412.1:

1) Provision target volume phase—Provision the LUN 416 associated with the primary storage appliance 412.1 as the target volume.

2) Multi-pathing phase—Present, to the host computer 402, the path 420 between the host computer 402 and the primary storage appliance 412.1. At this stage of the orchestration of phases, the path 420 is disabled, while the path 418 between the host computer 402 and the foreign storage system 404 is enabled.

3) Start mirroring phase—Mirror data from the source volume 414 to the target volume 416. Write requests issued by the host computer 402, for writing data to the source volume 414 or the target volume 416, are satisfied by writing the data simultaneously to both the source volume 414 and the target volume 416. Read requests issued by the host computer 402 are satisfied by reading the data from the source volume 414.

4) Path cutover phase—Disable the path 418 between the host computer 402 and the foreign storage system 404, and enable the path 420 between the host computer 402 and the primary storage appliance 412.1.

5) Synchronous copy phase—Copy all of the data from the source volume 414 to the target volume 416.

6) Role reversal and end mirroring phases—Reverse the roles of the source volume 414 and the target volume 416. After the role reversal, the LUN 416 is the source volume, and the LUN 414 is (temporarily) the target volume. Write requests for writing data to the source volume 416 are not mirrored to the target volume 414 (i.e., data mirroring from the source volume 416 to the target volume 414 is terminated). Read requests are serviced from the source volume 416. The primary storage appliance 412.1 takes a snapshot of the source volume 416 to obtain a common base snapshot for subsequent asynchronous copying operations.

7) Delete target volume phase—Delete the target volume 414 on the storage device array 406 associated with the foreign storage system 404. Once the target volume 414 is deleted, the data import tasks are completed for importing the storage volume 414 associated with the foreign storage system 404 to the storage volume 416 associated with the primary storage appliance 412.1.

FIG. 4b depicts a second illustrative use case for performing data replication tasks within a clustered storage environment 400b. As shown in FIG. 4b, the second use case involves a host computer 424, a storage domain 426, and a storage domain 428. The storage domain 426 includes, as members of the storage domain 426, a plurality of data storage appliances 434.1, 434.2, . . . , 434.i. The data storage appliance 434.1 can be elected or otherwise designated to perform a role of a primary storage appliance, while each of the remaining data storage appliances 434.2, . . . , 434.i perform a role of a secondary storage appliance. The primary storage appliance 434.1 includes an orchestrator 442, which orchestrates shared orchestration phases for performing the data replication tasks. The primary storage appliance 434.1 is associated with a storage device array 430 that includes a storage drive arranged as a LUN 438 (the "source (or production) volume"). The storage domain 428 includes, as members of the storage domain 428, a plurality of data storage appliances 436.1, 436.2, . . . , 436.j. The data storage appliance 436.1 can be elected or otherwise designated to perform a role of a primary storage appliance, while each of the remaining data storage appliances 436.2, . . . , 436.j perform a role of a secondary storage appliance. Like the primary storage appliance 434.1, the primary storage appliance 436.1 can include an orchestrator 444. The primary storage appliance 436.1 is associated with a storage device array 432 that includes a storage drive arranged as a LUN 440 (the "target (or replica) volume"). The storage domain 426 and the storage domain 428 are interconnected by a metropolitan network (MAN) 452 or any other suitable network. It is noted that the host computer 424, the storage domain 426, and the storage domain 428 can be interconnected by at least one network (not shown), such as the network 108 (see FIG. 1). Such a network can include paths 446, 448. A "replicate volume" path 450, extending from the storage device array 430 to the storage device array 432, is depicted in FIG. 4b in phantom for purposes of illustration only.

The second illustrative use case for performing data replication tasks can involve the following orchestration of phases by the orchestrator 442 included in the primary storage appliance 434.1:

1) Provision target volume phase—Provision the LUN 440 associated with the primary storage appliance 436.1 as the target volume. It is noted that a LUN associated with any one of the secondary storage appliances 436.2, . . . , 436.i may alternatively be provisioned as the target volume.

2) Multi-pathing phase—Present, to the host computer 424, the path 448 between the host computer 424 and the primary storage appliance 436.1. At this stage of the orchestration of phases, the path 448 is disabled, while the path 446 between the host computer 424 and the primary storage appliance 434.1 is enabled.

3) Asynchronous copy phase—Copy a majority of data from a source volume (i.e., the LUN 438) to the target volume (i.e., the LUN 440).

The following stage "4" of the orchestration of phases is executed to maintain a normal replication state:

4) Asynchronous copy phase—Copy to the target volume 440, at intervals or periodically, any changes or differences between the data of the source volume 438 and the data of the target volume 440.

The following stages "5" through "8" of the orchestration of phases are executed to initiate a planned failover:

5) Start mirroring phase—Mirror the data from the source volume 438 to the target volume 440. Write requests issued by the host computer 424, for writing data to the source volume 438 or the target volume 440, are satisfied by writing the data simultaneously to both the source volume 438 and the target volume 440. Read requests issued by the host computer 424 are satisfied by reading the data from the source volume 438.

6) Synchronous copy phase—Copy all of the data (from the time of the most recent execution of the asynchronous copy phase in the normal replication state; i.e., stage "4" directly above) from the source volume 438 to the target volume 440. Once the data is copied, the data of the target volume 440 is fully synchronized with the data of the source volume 438.

7) Path cutover phase—Disable the path 446 between the host computer 424 and the primary storage appliance 434.1, and enable the path 448 between the host computer 424 and the primary storage appliance 436.1.

8) Role reversal and end mirroring phases—Reverse roles of the source volume 438 and the target volume 440. After the role reversal, the LUN 440 is the source volume, and the LUN 438 is the target volume. Write requests for writing data to the source volume 440 are not mirrored to the target volume 438. Read requests are serviced from the source volume 440. The primary storage appliance 436.1 takes a snapshot of the source volume 440, and the primary storage appliance 434.1 takes a snapshot of the target volume 438, thereby obtaining common base snapshots for subsequent asynchronous copying operations.

The following stages "9" through "13" of the orchestration of phases are executed to initiate a failback, assuming that the primary storage appliance 434.1 is to be brought down for maintenance, and subsequently brought back up for further operation (during the stages "9" through "13", it is further assumed that the LUN 438 is the source volume, and the LUN 440 is the target volume):

9) Asynchronous copy phase—Copy, to the target volume 440, any changes or differences between the data of the source volume 438 and the data of the target volume 440.

10) Start mirroring phase—Mirror the data from the target volume 440 to the source volume 438. Read requests issued by the host computer 424 are satisfied by reading the data from the target volume 440.

11) Synchronous copy phase—Copy, to the target volume 440, any changes or differences (from the time of the most recent execution of the asynchronous copy phase; i.e., stage "9" directly above) between the data of the source volume 438 and the data of the target volume 440. Once the data is copied, the data of the target volume 440 is fully synchronized with the data of the source volume 438.

12) Path cutover phase—Disable the path 446 between the host computer 424 and the primary storage appliance 434.1, and enable the path 448 between the host computer 424 and the primary storage appliance 436.1.

13) Role reversal and end mirroring phases—Reverse the roles of the source volume 438 and the target volume 440. After the role reversal, the LUN 440 is the source volume, and the LUN 438 is the target volume. Write requests for writing data to the source volume 440 are not mirrored to the target volume 438. Read requests are serviced from the source volume 440. The primary storage appliance 434.1 takes a snapshot of the target volume 438, and the primary storage appliance 436.1 likewise takes a snapshot of the source volume 440, thereby obtaining common base snapshots for subsequent asynchronous copying operations.

At this stage of the orchestration of phases, the failback is completed. The orchestration of phases can then continue in the normal replication state (i.e., stage "4" above—asynchronous copy phase), with the orchestrator 442 included in the primary storage appliance 436.1 orchestrating the shared orchestration phases.

FIG. 4c depicts a third illustrative use case for performing data migration tasks within a clustered storage environment 400c. As shown in FIG. 4c, the third use case involves a host computer 454 and a storage domain 456. The storage domain 456 includes, as members of the storage domain 456, a plurality of data storage appliances 462.1, 462.2, . . . , 462.i. The data storage appliance 462.1 can be elected or otherwise designated to perform a role of a primary storage appliance, while each of the remaining data storage appliances 462.2, . . . , 462.i perform a role of a secondary storage appliance. The primary storage appliance 462.1 includes an orchestrator 468, which orchestrates the shared orchestration phases for performing the data migration tasks. The primary storage appliance 462.1 is associated with a storage device array 458 that includes a storage drive arranged as a LUN 464 (the "source volume"). The secondary storage appliance 462.i is associated with a storage device array 460 that includes a storage drive arranged as a LUN 466 (the "target (or secondary) volume"). It is noted that the host computer 454 and the storage domain 456 can be interconnected by at least one network (not shown), such as the network 108 (see FIG. 1). Such a network can include paths 470, 472. A "migrate volume" path 474, extending from the storage device array 458 to the storage device array 460, is depicted in FIG. 4c in phantom for purposes of illustration only.

The third illustrative use case for performing data migration tasks can involve the following orchestration of phases by the orchestrator 468 included in the primary storage appliance 462.1:

1) Provision target volume phase—Provision the LUN 466 associated with the secondary storage appliance 462.i as the target volume. It is noted that a LUN associated with any one of the secondary storage appliances 462.2, . . . , 462.i may alternatively be provisioned as the target volume.

2) Multi-pathing phase—Present, to the host computer 454, the path 472 between the host computer 454 and the secondary storage appliance 462.i. At this stage of the orchestration of phases, the path 472 is disabled, while the path 470 between the host computer 454 and the primary storage appliance 462.1 is enabled.

3) Asynchronous copy phase—Copy a majority of data from a source volume (i.e., the LUN 464) to the target volume (i.e., the LUN 466).

4) Start mirroring phase—Mirror the data from the source volume 464 to the target volume 466. Write requests issued by the host computer 454, for writing data to the source volume 464 or the target volume 466, are satisfied by writing the data simultaneously to both the source volume 464 and the target volume 466. Read requests issued by the host computer 454 are satisfied by reading the data from the source volume 464.

5) Synchronous copy phase—Copy, to the target volume 466, any changes or differences (from the time of the most recent execution of the asynchronous copy phase; i.e., stage "3" directly above) between the data of the source volume 464 and the data of the target volume 466. Once the data is copied, the data of the target volume 466 is fully synchronized with the data of the source volume 464.

6) Path cutover phase—Disable the path 470 between the host computer 454 and the primary storage appliance 462.1, and enable the path 472 between the host computer 454 and the primary storage appliance 462.i.

7) Role reversal and end mirroring phases—Reverse roles of the source volume 464 and the target volume 466. After the role reversal, the LUN 466 is the source volume, and the LUN 458 is (temporarily) the target volume. Write requests for writing data to the source volume 466 are not mirrored to the target volume 464. Read requests are serviced from the source volume 466. The primary storage appliance 464.1 takes a snapshot of the target volume 464, and the secondary storage appliance 462.i likewise takes a snapshot of the source volume 466, thereby obtaining common base snapshots for subsequent asynchronous copying operations.

8) Delete target volume phase—Delete the target volume 464 on the storage device array 458 associated with the primary storage appliance 462.1. Once the target volume 464 is deleted, the data migration tasks are completed for migrating the storage volume 464 associated with the primary storage appliance 462.1 to the storage volume 466 associated with the secondary storage appliance 462.i.

As described herein with regard to the foregoing illustrative first, second, and third use cases, the provision target volume phase, the asynchronous copy phase, the multi-pathing phase, the start mirroring phase, the end mirroring phase, the synchronous copy phase, the path cutover phase, and the role reversal phase are each shared among the data import tasks, the data replication tasks, and the data migration tasks. It is noted, however, that while the delete target volume phase is shared among the data import tasks and the data migration tasks of the first use case and the third use case, respectively, the delete target volume phase is not executed as part of the data replication tasks of the second use case.

Figure 5:
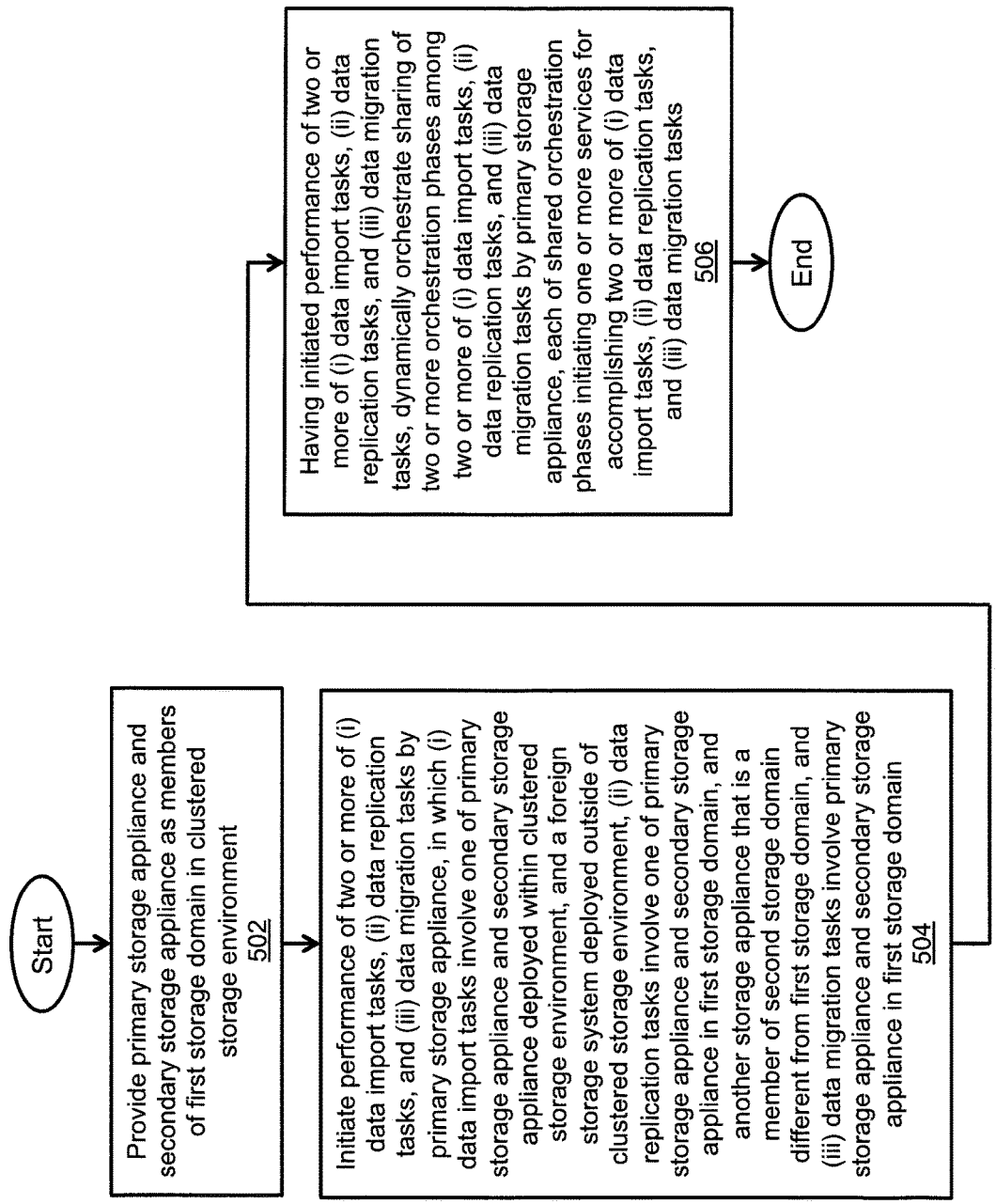
FIG. 5 is an exemplary method of providing a unified approach to an orchestration of services for accomplishing data import tasks, data replication tasks, and/or data migration tasks in the clustered storage environment of FIG. 1.

An exemplary method of providing a unified approach to an orchestration of services for accomplishing data import tasks, data replication tasks, and/or data migration tasks in a clustered storage environment is described below with reference to FIG. 5. As depicted in block 502, a primary storage appliance and a secondary storage appliance are provided as members of a first storage domain in the clustered storage environment. As depicted in block 504, performance of two or more of (i) the data import tasks, (ii) the data replication tasks, and (iii) the data migration tasks is initiated by the primary storage appliance, in which (i) the data import tasks involve one of the primary storage appliance and the secondary storage appliance deployed within the clustered storage environment, and a foreign storage system deployed outside of the clustered storage environment, (ii) the data replication tasks involve one of the primary storage appliance and the secondary storage appliance in the first storage domain, and another storage appliance that is a member of a second storage domain in the clustered storage environment, the second storage domain being different from the first storage domain, and (iii) the data migration tasks involve the primary storage appliance and the secondary storage appliance in the first storage domain. As depicted in block 506, having initiated the performance of two or more of (i) the data import tasks, (ii) the data replication tasks, and (iii) the data migration tasks, a sharing of two or more orchestration phases among the two or more of (i) the data import tasks, (ii) the data replication tasks, and (iii) the data migration tasks is dynamically orchestrated by the primary storage appliance, each of the shared orchestration phases initiating one or more services for accomplishing the two or more of (i) the data import tasks, (ii) the data replication tasks, and (iii) the data migration tasks.

Having described the foregoing illustrative embodiments, other alternative embodiments and/or variations may be made and/or practiced. For example, it was described herein that each of the illustrative use cases for performing data import tasks, data replication tasks, and data migration tasks involves a first storage drive arranged as a first LUN (i.e., a source volume) and a second storage drive arranged as a second LUN (i.e., a target volume). In an alternative embodiment, for each of the illustrative use cases described herein, the respective source and target volumes can be replaced with (i) source and target VVOLs, (ii) source and target file systems, (iii) source and target consistency (or application) groups, or any other suitable source and target storage objects. It is noted that, in the case where the respective source and target volumes are replaced with source and target consistency (or application) groups, the continuity of a host application after a failover can be maintained by performing consistent snapshot operations during orchestration of the shared orchestration phases, allowing the host application to successfully keep track of write-order consistency for storage volumes within the respective consistency (or application) groups.

It was further described herein, with reference to the multi-pathing orchestration phase, that, by executing multi-pathing code resident in its memory, a host computer could be made to view a path to a target volume as another path to a source volume. In an alternative embodiment, the host computer can be configured to be compatible with the asymmetrical logical unit access (ALUA) standard, which is an extension to the small computer system interface (SCSI) protocol. For example, such an ALUA-compatible host computer may receive an indication of the readiness of an ALUA-compatible storage system (or appliance) on a particular (or optimal) path to the host computer, and transition to communicating with the storage system (or appliance) over the particular (or optimal) path, without first having to be re-started to reset its path information.

While various embodiments of the invention have been particularly shown and described, it will be understood by those skilled in the art that various changes in form and/or details may be made therein without departing from the scope of the invention, as defined by the appended claims.

What is claimed is:

1. A method of providing a unified approach to an orchestration of services for accomplishing data mobility tasks in a clustered storage environment, comprising:

providing a primary storage appliance and a secondary storage appliance as members of a first storage domain in the clustered storage environment;

initiating performance of a data replication task for replicating data from a second storage domain in the clustered storage environment to the first storage domain and a data migration task for migrating data within the first storage domain by the primary storage appliance; and having initiated the performance of the data replication task and the data migration task, dynamically orchestrating, by the primary storage appliance, a sharing of two or more orchestration phases among the data replication task and the data migration task, the two or more orchestration phases initiating a unified approach to an orchestration of services for accomplishing the data replication task and the data migration task.

2. The method of claim 1 wherein the initiating of the performance of the data replication task and the data migration task includes initiating the data replication task and the data migration task between a source storage object and a target storage object, each of the source storage object and the target storage object being one of a storage volume, a virtual volume, a file system, and a consistency (or application) group.

3. The method of claim 1 wherein the initiating of the performance of the data replication task and the data migration task includes initiating the data replication task and the data migration task between a source storage object and a target storage object, the source storage object and the target storage object being a source volume and a target volume, respectively.

4. The method of claim 3 wherein the dynamically orchestrating of the sharing of two or more orchestration phases includes dynamically orchestrating the sharing of two or more of (i) a first phase to provision the target volume, (ii) a second phase to perform an asynchronous copy of data from the source volume to the target volume, (iii) a third phase to present, to a host computer, a path between the target volume and the host computer, (iv) a fourth phase to mirror the data from the source volume to the target volume, (v) a fifth phase to terminate the mirroring of the data from the source volume to the target volume, (vi) a sixth phase to perform a synchronous copy of the data from the source volume to the target volume, (viii) a seventh phase to disable a path between the source volume and the host computer, and to enable the path between the target volume and the host computer, (viii) an eighth phase to reverse roles of the source volume and the target volume, and (ix) a ninth phase to delete the target volume.

5. The method of claim 4 wherein the second phase for performing an asynchronous copy of data from the source volume to the target volume includes taking a common base snapshot of the source volume, and moving data of the common base snapshot to the target volume by copying at least some of the data of the common base snapshot asynchronously.

6. The method of claim 1 wherein the initiating of the unified approach to the orchestration of services for accomplishing the data replication task and the data migration task includes initiating one or more layered services including (i) a first service to mirror data from a local volume to a remote volume, (ii) a second service to copy data from one storage volume to another storage volume, (iii) a third service to coordinate activities between the first service and the second service, and (iv) a fourth service to provide a proxy service to the remote volume, allowing one or more of the first service, the second service, and the third service to treat the remote volume as the local volume.

7. The method of claim 6 further comprising:
for each of the two or more orchestration phases, engaging one or more of the first service, the second service, the third service, and the fourth service for accomplishing the data replication task and the data migration task.

8. The method of claim 7 further comprising:
receiving, at an adapter layer of the primary storage appliance, one or more service directives from one or more of the first service, the second service, the third service, and the fourth service;
performing one or more translations on the respective service directives from a common orchestration service to one of a local system call and a remote system call to a destination storage system (or appliance); and
forwarding, by the primary storage appliance, the one of the local system call and the remote system call to the destination storage system (or appliance).

9. The method of claim 8 further comprising:
receiving, at the adapter layer of the primary storage appliance, one or more responses from the destination storage system (or appliance);
performing one or more translations on the respective responses; and
forwarding the respective responses to one or more of the first service, the second service, the third service, and the fourth service from which the one or more service directives were originally received.

10. The method of claim 1 further comprising:
involving, in the data replication task, one of the primary storage appliance and the secondary storage appliance in the first storage domain, and another storage appliance that is a member of the second storage domain in the clustered storage environment, the second storage domain being different from the first storage domain; and
involving, in the data migration task, the primary storage appliance and the secondary storage appliance in the first storage domain.

11. A system for providing a unified approach to an orchestration of services for accomplishing data mobility tasks in a clustered storage environment, comprising:
a primary storage appliance;
one or more secondary storage appliances,
wherein the primary storage appliance and the one or more secondary storage appliances are members of a first storage domain in the clustered storage environment; and
at least one network interconnecting the primary storage appliance and the one or more secondary storage appliances,
wherein the primary storage appliance is configured to execute program instructions to:
initiate performance of a data replication task for replicating data from a second storage domain in the clustered storage environment to the first storage domain and a data migration task for migrating data within the first storage domain; and
having initiated the performance of the data replication task and the data migration task, dynamically orchestrate a sharing of two or more orchestration phases among the data replication task and the data migration task,
wherein the two or more orchestration phases are configured to initiate a unified approach to an orchestration of services for accomplishing the data replication task and the data migration task.

12. The system of claim 11 wherein the primary storage appliance is further configured to execute the program instructions to initiate the data replication task and the data migration task between a source storage object and a target storage object, each of the source storage object and the target storage object being one of a storage volume, a virtual volume, a file system, and a consistency (or application) group.

13. The system of claim 11 wherein the primary storage appliance is further configured to execute the program instructions to initiate the data replication task and the data migration task between a source storage object and a target storage object, the source storage object and the target storage object being a source volume and a target volume, respectively.

14. The system of claim 13 wherein the primary storage appliance is further configured to execute the program instructions to dynamically orchestrate the sharing of two or more of (i) a first phase to provision the target volume, (ii) a second phase to perform an asynchronous copy of data from the source volume to the target volume, (iii) a third phase to present, to a host computer, a path between the target volume and the host computer, (iv) a fourth phase to mirror the data from the source volume to the target volume, (v) a fifth phase to terminate the mirroring of the data from the source volume to the target volume, (vi) a sixth phase to perform a synchronous copy of the data from the source volume to the target volume, (viii) a seventh phase to disable a path between the source volume and the host computer, and to enable the path between the target volume and the host computer, (viii) an eighth phase to reverse roles of the source volume and the target volume, and (ix) a ninth phase to delete the target volume.

15. The system of claim 11 wherein the primary storage appliance is further configured to execute the program instructions to initiate one or more layered services including (i) a first service to mirror data from a local volume to a remote volume, (ii) a second service to copy data from one storage volume to another storage volume, (iii) a third service to coordinate activities between the first service and the second service, and (iv) a fourth service to provide a proxy service to the remote volume, allowing one or more of the first service, the second service, and the third service to treat the remote volume as the local volume.

16. The system of claim 15 wherein the primary storage appliance is further configured to execute the program instructions, for each of the two or more orchestration phases, to engage one or more of the first service, the second service, the third service, and the fourth service for accomplishing the data replication task and the data migration task.

17. A computer program product including a set of non-transitory, computer-readable media having instructions that, when executed by control circuitry of a computerized apparatus, cause the control circuitry to perform a method of providing a unified approach to an orchestration of services for accomplishing data mobility tasks in a clustered storage environment, the method comprising:

initiating performance of a data replication task for replicating data from a second storage domain in the clustered storage environment to a first storage domain and a data migration task for migrating data within the first storage domain by a primary storage appliance, the primary storage appliance being a member of the first storage domain in the clustered storage environment, the first storage domain including a secondary storage appliance as an additional member of the first storage domain; and having initiated the performance of the data replication task and the data migration task, dynamically orchestrating, by the primary storage appliance, a sharing of two or more orchestration phases among the data replication task and the data migration task, the two or more orchestration phases initiating a unified approach to an orchestration of services for accomplishing the data replication task and the data migration task.

18. The computer program product of claim 17 wherein the dynamically orchestrating of the sharing of two or more orchestration phases includes dynamically orchestrating the sharing of two or more of (i) a first phase to provision a target volume, (ii) a second phase to perform an asynchronous copy of data from a source volume to the target volume, (iii) a third phase to present, to a host computer, a path between the target volume and the host computer, (iv) a fourth phase to mirror the data from the source volume to the target volume, (v) a fifth phase to terminate the mirroring of the data from the source volume to the target volume, (vi) a sixth phase to perform a synchronous copy of the data from the source volume to the target volume, (viii) a seventh phase to disable a path between the source volume and the host computer, and to enable the path between the target volume and the host computer, (viii) an eighth phase to reverse roles of the source volume and the target volume, and (ix) a ninth phase to delete the target volume.

19. The computer program product of claim 17 wherein the initiating of the unified approach to the orchestration of services for accomplishing the data replication task and the data migration task includes initiating one or more layered services including (i) a first service to mirror data from a local volume to a remote volume, (ii) a second service to copy data from one storage volume to another storage volume, (iii) a third service to coordinate activities between the first service and the second service, and (iv) a fourth service to provide a proxy service to the remote volume, allowing one or more of the first service, the second service, and the third service to treat the remote volume as the local volume.

20. The computer program product of claim 19 wherein the method further comprises:

for each of the two or more orchestration phases, engaging one or more of the first service, the second service, the third service, and the fourth service for accomplishing the data replication task and the data migration task.

* * * * *